United States Patent [19]

Claverie et al.

[11] Patent Number: 5,207,839
[45] Date of Patent: May 4, 1993

[54] PROCESSES FOR THE PRODUCTION OF A CONTROLLED ATMOSPHERE FOR HEAT TREATMENT OF METALS

[75] Inventors: Pierre Claverie, Boulogne Billancourt; Eric Duchateau, Versailles; Pierre Karinthi, Jouy-en-Josas; Philippe Queille, Viroflay, all of France

[73] Assignee: L'Air Liquide, Societe Anonyme pour l'Etude et l'Exploitation des Procedes Geroges Claude, Paris, France

[21] Appl. No.: 777,676

[22] Filed: Oct. 15, 1991

[30] Foreign Application Priority Data

Oct. 18, 1990 [FR] France .................... 90 12874

[51] Int. Cl.$^5$ ............................................. C21D 1/00
[52] U.S. Cl. ...................................... 148/206; 148/208; 148/237
[58] Field of Search ................... 148/206, 208, 237

[56] References Cited

U.S. PATENT DOCUMENTS

| | | | |
|---|---|---|---|
| 3,224,909 | 12/1965 | Sixtus et al. | 148/16 |
| 4,683,125 | 7/1987 | Yusa | 423/219 |
| 5,069,728 | 12/1991 | Rancon et al. | 148/16 |

FOREIGN PATENT DOCUMENTS 3511919 9/1987 Fed. Rep. of Germany .
770906 3/1957 United Kingdom .

Primary Examiner—Upendra Roy
Attorney, Agent, or Firm—Curtis, Morris & Safford

[57] ABSTRACT

Substantially all residual oxidizing gas in a treating atmosphere which is inert or reducing, is eliminated by injecting into the atmosphere a gaseous silicon hydride at a temperature between 50 and 1,600° C. and in amount such that the ratio R of the content of hydride to the content of oxidizing gas to be eliminated is within the range of 1.5 to 20. The rapid action of the trace amounts of hydride injected enables one to control with precision heat treatment processes by maintaining the residual oxidizing gas contents below predetermined very low thresholds.

12 Claims, 2 Drawing Sheets

PROCESSES FOR THE PRODUCTION OF A CONTROLLED ATMOSPHERE FOR HEAT TREATMENT OF METALS

BACKGROUND OF THE INVENTION (a) Field of the Invention

The present invention concerns the production of a controlled atmosphere for the heat treatment of metals in at least one treatment oven or vessel, the atmosphere consisting essentially of inert or reducing gases which are either pure or in mixture. More particularly, the invention is directed to a process for the production of a controlled atmosphere which is substantially free of oxidizing gases.

The present invention can be applied to the production of controlled, heated protective atmospheres adapted for heat treatments, such annealing, heating after hardening, sintering and brazing, for coating operations by deposition onto hardened articles, such as galvanizing and aluminizing, for the production of metals which are very sensitive to oxidation, such as titanium, zirconium and aluminum-lithium alloys, or for the co-sintering of multilayered ceramics and metals, or the binding of ceramics and metals. These controlled atmospheres are used at varying pressures ranging from $10^{-3}$ Pa to $10^8$ Pa (absolute pressure) depending on the type of vessel utilized for the treatment.

(b) Description of Prior Art

Controlled atmospheres are generally produced starting from industrial gases or exothermic or endothermic generators gases and typically they consist mainly of inert gases, such as nitrogen, argon or helium, and/or of reducing gases, such as hydrogen or carbon monoxide, which are either pure or in mixture. In order to produce a controlled atmosphere in a vessel, these gases are injected into the vessel under a flow sufficient to minimize the content of residual oxidizing gases, such as water vapor, carbon dioxide and/or oxygen. To prevent oxidation, and considering the modifications of the chemical composition of the products treated or produced under such controlled atmospheres, it is necessary that the controlled atmospheres be inert, eventually reducing with respect to the metal under consideration or sufficiently weakly oxidizing to prevent a significant oxidation from occurring during the treatment. However, trace amounts of oxidizing gases, such as $H_2O$ and $O_2$, remain in the controlled atmosphere due to micro-leaks in the gas conduit systems or in the treatment vessel, of continuous or discontinuous feed materials or articles charged in the treatment vessel, resulting in air entries which are disastrous to the controlled atmospheres in terms of quality, in wrong handling of the gas system, of the surface condition of the articles to be treated or of their degassing during their heating.

SUMMARY OF INVENTION

It is an object of the present invention to provide a process for the production of a controlled atmosphere of the above type, which process is simple to carry out, effective, ensures very low residuals contents of oxidizing impurities, affords a great flexibility of use and does not significantly increase production costs.

This object is achieved according to the invention by injecting into the treatment vessel a silicon hydride in gaseous state in an amount such that in the treating atmosphere the ratio R of the content of silicon hydride to the content of oxidizing gas to be eliminated is initially within the range of 1.5 to 20, at the moment of injection, under the operating pressure and temperature conditions and depending on the vessel geometry. Such a ratio R is typically between 2 and 10, most preferably between 2 and 4. The maximum content of silicon hydride does not exceed 30,000 ppm, and is typically below 20,000 ppm.

According to an embodiment of the invention, the silicon hydride in pure or diluted form, which is injected directly into the vessel, typically comprises monosilane ($SiH_4$), disilane ($Si_2H_6$) or trisilane ($Si_3H_8$).

Applicant has found quite unexpectedly that small quantities of gaseous silicon hydride introduced into the heat treatment vessels enable residual oxidizing impurities in the treating atmosphere to be very rapidly eliminated, within wide ranges of pressures and temperatures, including low temperatures, starting from 20° C. The rapid action of the hydrides renders the process particularly suitable for carrying out numerous heat treatments of metals and, more particularly, enables one to control with precision and reliability the level of oxidizing impurities to a predetermined threshold depending on the type of heat treatment.

According to another embodiment, in order to eliminate trace amounts of oxygen by direct injection into the vessel of the hydride which may be pure or in diluted form, the temperature of the vessel is within the range of 50° to 1,600° C., typically between 150° and 1,600° C. when the hydride is monosilane, or between 50° and 700° C. when the hydride is disilane. For eliminating $H_2O$ or $CO_2$, the temperature of the vessel is within the range of 400° to 800° C., typically between 450° and 800° C. when the hydride is monosilane, or between 400° and 800° C. when the hydride is disilane.

More specifically, the preferred operating conditions of the process according to the invention are as follows:
1. Elimination of residual trace amounts of oxygen:
    1.1. With injection of monosilane in pure or diluted form:
        the temperature of the vessel is within the range of 150° to 1,600° C.;
        the pressure in the vessel is within the range of $10^{-2}$ Pa to $10^8$ Pa;
        the initial ratio R between the amount of injected silane and the amount of oxygen present in the treating atmosphere is selected between 1.5 and 20 depending on the temperature and pressure conditions and the vessel geometry.
    1.2. With injection of disilane in pure or diluted form:
        the temperature of the vessel is within the range of 50° to 700° C.;
        the other parameters are identical to those set forth in the preceding paragraph.
2. Elimination of residual trace amounts of water vapor and/or carbon dioxide:
    2.1. With injection of monosilane in pure or diluted form:
        the temperature of the vessel is within the range of 450° to 800° C.;
        the pressure in the vessel is within the range of $10^{-2}$ Pa to $10^8$ Pa;
        the initial ratio R is within the range of 2 to 20.
    2.2. With injection of disilane in pure or diluted form:
        the temperature of the vessel is within the range of 400° to 700° C.;
        the other parameters are similar to those set forth in the preceding paragraph.

BRIEF DESCRIPTION OF DRAWINGS

Further features and advantages of the invention will become more readily apparent from the following description of preferred embodiments as illustrated by way of example in the accompanying drawings, in which.

DESCRIPTION OF PREFERRED EMBODIMENTS

Example 1

Figure 1:
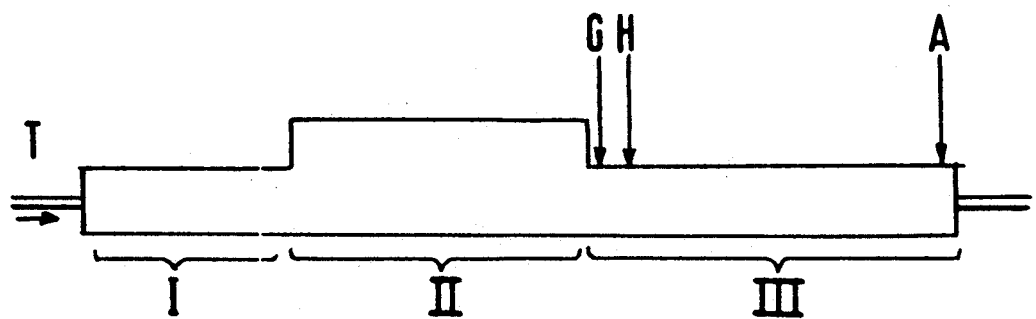
FIG. 1 is a schematic representation of a band oven for powder metallurgy.
Figure 2:
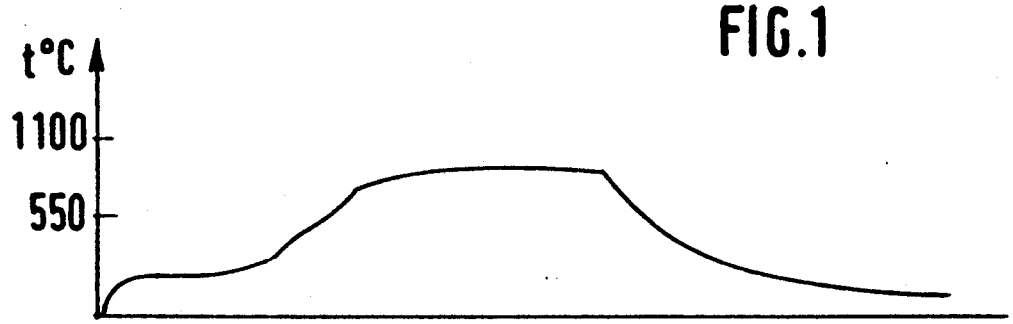
FIG. 2 is a diagram showing the temperature profile inside the oven illustrated in FIG. 1.

Powder metallurgy:

The band oven illustrated in FIG. 1 comprises three successive zones, a preheating zone I, a heating zone II and a cooling zone III, through which the articles to be treated are passed by means of the band T. The temperature of the heating zone II is above 1,000° C. and may reach 1,120° C. for powder sintering. The main injection of the gaseous treating atmosphere which comprises a mixture of nitrogen and hydrogen is effected in area G, at the end of the heating zone. Conventionally, although the hydrogen content is quite important (17% of the total flow of the gaseous treating atmosphere), at the end of the cooling zone III there are trace amounts of oxidizing species (water vapor and oxygen) of the order of 50 to 60 ppm, which are sufficient to oxidize the articles. On the other hand, Applicant has noted that a residual oxygen content of 10 ppm remains acceptable for the treatment processes under consideration.

According to the invention, an analyser A is positioned at the end of the cooling zone III, the analyser continuously measuring the residual oxygen content in the oven atmosphere. This value, compared to the above threshold of 10 ppm, enables one to control in discontinuous manner the injection of predetermined amounts of monosilane $SiH_4$ in the area H at the end of the heating zone. As the temperature in the zone of injection of the monosilane is about 550° C., one adopts a mean ratio R of silane/oxidizing impurities which is avantageously above 15, typically of 18, and corresponds to injecting 180 ppm of silane in the main atmosphere for a maximum threshold of residual oxygen of 10 ppm. When the analyser detects an oxygen content above 10 ppm, silane is injected into the vessel. As soon as the residual oxygen content detected by the analyser reaches a value below 10 ppm, the silane injection is interrupted.

Figure 3:
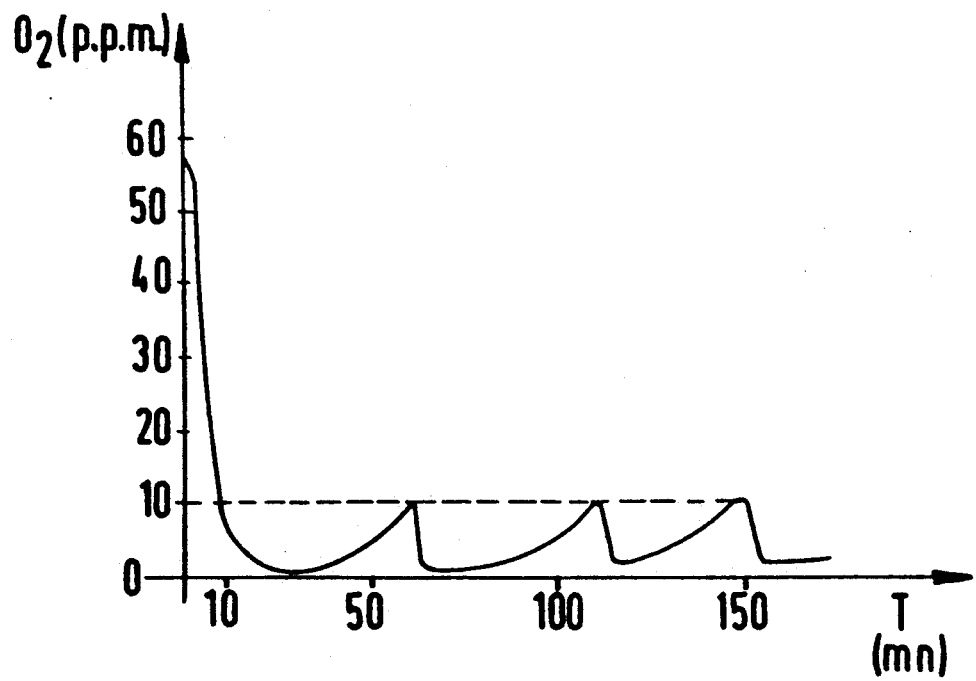
FIG. 3 is a diagram showing the change in the residual oxygen level upon carrying out the process of the invention in the oven illustrated in FIG. 1.

FIG. 3 shows the change in the residual oxygen level in the vessel of FIG. 1 when carrying out the process of the invention as described above.

In this type of application, the mean quantity of hydride injected into the treating atmosphere is of the order of 1,000 ppm.

EXAMPLE 2

Heat treatment of steel in oven under vacuum:

A conventional complete cycle of transformation of Z5CN17 type steel articles lasts 7 hours, and comprises a vacuum pumping in the vessel to obtain a vacuum of $1.10^{-2}$ Pa, followed by a temperature rise up to 660° C., and then by an homogenization stage. A new temperature rise up to 900° C. precedes an homogenization stage before injecting a mixture of nitrogen and hydrogen to achieve a hardening at an absolute pressure of about 5 Pa. It has been noted that an oxidizing pollution threshold, in this case oxygen, even very low, of the order of 80 ppm, and resulting for example from the poorly controllable degree of pollution of the containers containing the articles to be treated, is sufficient to oxidize the latter and destroy part of the production.

In order to overcome the above drawbacks, according to the invention, there is injected in the oven a gaseous mixture of nitrogen and oxygen containing monosilane in an initial ratio R silane/oxygen of the order of 3.8 depending on the geometry of the oven under vacuum; this corresponds to injecting 295 ppm of silane into the $N_2/H_2$ mixture. This mixture is introduced at a temperature between 300° and 350° C., typically of the order of 330° C., into the oven under vacuum and then the temperaturesrises in the oven is suspended for a period of more than 10 minutes, typically of 15 minutes, so as to trap oxidizing impurities, after which the temperature rise is resumed up to the utilization point, at a temperature above 800° C., with the same homogenization stages.

Figure 4:
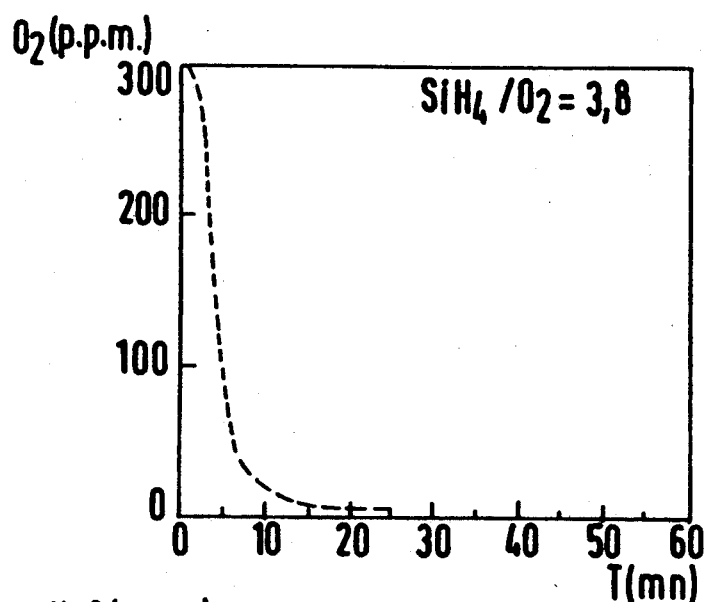
FIG. 4 is a diagram illustrating the reduction of the residual oxygen content after injection of monosilane under vacuum for the heat treatment of alloyed steels.

FIG. 4 shows that all risk of oxydation in the vessel under vacuum is substantially eliminated.

In this type of application, the mean quantity of hydride injected into the treating atmosphere is of the order of 700 ppm.

EXAMPLE 3

Annealing of steel wires in a bell oven:

During heat treatment of coils of steel wires with a low carbon content in a bell oven under a controlled atmosphere (mixture of nitrogen and hydrogen with 5% hydrogen), decarburation problems as well as an oxidation of the wires occur. These phenomena are due to problems of sealing of the sand joints which join the bell to its base.

Analysis of the atmosphere shows that at the beginning of the cycle the dew point increases up to a value of the order of 3,000 ppm at 650° C., whereas the residual oxygen content remains below 10 ppm. At the end of the cycle, the residual water content is 600 ppm and the oxygen content increases to 100 ppm.

In order to cause the dew point to drop, it has been proposed to inject small quantities of hydrocarbons (propane $C_3H_8$) into the gaseous atmosphere, but the results appeared deceiving since, at the treating temperature (650° C.), the hydrocarbon is not sufficiently reactive.

Figure 5:
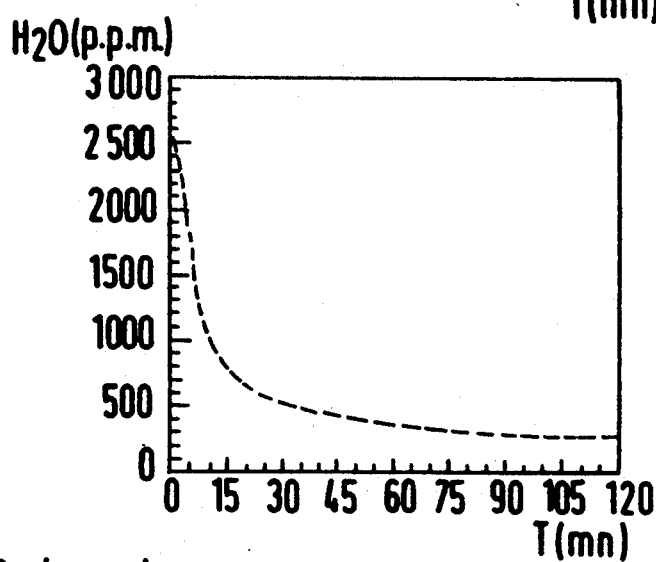
FIG. 5 is a diagram showing the reduction of the dew point after injection of silane in a bell oven for annealing steel wires having a low carbon content.

The results of analysis of the oxidizing impurities in the gaseous atmosphere show that two differents ratios R must be utilized at different moments. Indeed, at the beginning, water vapor is the oxidizing agent to be considered as the oxygen content is negligible and the decarburation by $H_2O$ should be avoided. The ratio R is selected for a maximum value of water vapor to be eliminated. In view of the reaction kinetic and the vessel volume, a value of 3 has been retained, which corresponds to 9,000 ppm of silane in the vessel. At the end of the cycles oxygen is the oxidizing agent to be considered as oxidation of the wires is to be avoided. The water vapor content being stabilized at 300 ppm, as shown in FIG. 5, the ratio $H_2/H_2O$ is above 10, which excludes oxidation by this impurity. In view of the reaction kinetic and the vessel volume, a ratio R of 5 is thus been retained for eliminating the 100 ppm of oxygen at the end of the cycle, which corresponds to injecting 500 ppm of silane in the vessel during cooling.

FIG. 5 illustrates the dew point drop, at atmospheric pressure in the first injection of silane during the temperature rise: the dew point drops from a value of 2,600 ppm to a value below 300 ppm at the end of 2 hours. This value thereafter remains stationary during the stage, then during cooling. On the other hand, no rise in the oxygen content at the end of the cycle has been noticed.

In this type of application, the mean hydride content in the controlled atmosphere is of the order to 20,000 ppm.

EXAMPLE 4

Continuous aluminizing of metal sheets:

During deposition of aluminum onto a metal sheet by dipping into an aluminum bath, it is essential to maintain a non-oxidizing atmosphere in the bell over the bath. If this atmosphere contains a few ppm of oxygen, a thin film of alumina is formed on the surface of the bath and may be entrained with the metal sheet, thus inhibiting the wetting of the latter by the liquid aluminum.

According to the invention, monosilane is injected in the bell over the aluminum bath so as to obtain a residual oxygen value below 3 ppm in the inert nitrogen atmosphere of the bell. In view of the bath geometry, an initial ratio R silane/oxidizing impurities above 10 is selected, which is typically about 16, the silane injection being effected at a plurality of locations over the aluminum bath.

Figure 6:
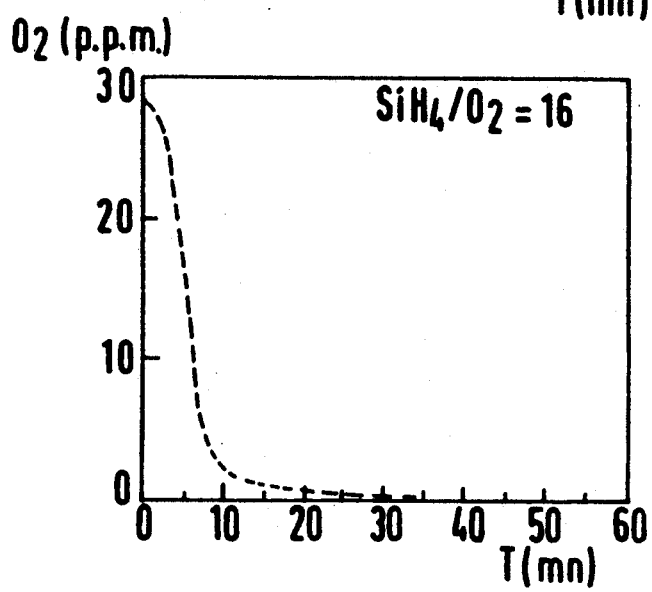
FIG. 6 is a diagram showing the reduction of the residual oxygen content after injection of silane above a bath for aluminizing sheet metal.

FIG. 6 shows the effect of these silane injections on the residual oxygen content in the inert atmosphere of the bell, at atmospheric pressure and a temperature of 600° C. (mean temperature in the bell).

In this type of application, the mean quantity of hydride injected into the atmosphere is of the order of 500 ppm.

We claim:

1. A process for the production of a controlled atmosphere substantially free of residual oxidizing gases for the heat treatment of metals in at least one treatment vessel, said atmosphere consisting essentially of inert or reducing gases which are pure or in a mixture, comprising injecting a silicon hydride in the gaseous state into said vessel in an amount such that the ratio R of the content of silicon hydride injected, to the content of oxidizing gases to be eliminated, is within the range of 1.5 to 20.

2. Process according to claim 1, wherein the silicon hydride is injected into the vessel in an amount such that the ratio R is within the range of 2 to 20.

3. Process according to claim 1, wherein said vessel is maintained at a temperature between 50° and 1,100° C. whereby to eliminate trace amounts of oxygen from said gaseous atmosphere.

4. Process according to claim 1, wherein said vessel is maintained at a temperature between 400° and 800° C. whereby to eliminate trace amounts of water vapor and carbon dioxide from said gaseous atmosphere.

5. Process according to claim 1, for the heat treatment of steel in an oven under vacuum, wherein a silane is introduced into the oven at a temperature between 300° and 350° C. and in an amount such that the ratio R is about 3.8, and after a period of more than 10 minutes, the oven temperature is increased stepwise up to a temperature above 800° C.

6. Process according to claim 3, wherein said hydride comprises monosilane and the vessel temperature is between 150° and 1,100° C.

7. Process according to claim 3, wherein said hydride comprises disilane and the vessel temperature is between 50° and 750° C.

8. Process according to claim 4, wherein said hydride comprises monosilane and the vessel temperature is between 450° and 800° C.

9. Process according to claim 4, wherein said hydride comprises disilane and the vessel temperature is between 400° and 800° C.

10. A process for the production of a controlled atmosphere substantially free of residual oxidizing gases for the treatment of metal powders in an oven including a heating zone at a temperature above 1,000° C. and a cooling zone, comprising injecting a silane in an area of the oven upstream of the cooling zone at a temperature above 500° C., in an amount such that the ratio R of the content of silane injected, to the content of oxidizing gases to be eliminated, is above 15 and less than or equal to 20.

11. Process according to claim 10, wherein the residual oxygen content in the cooling zone is continuously measured and wherein a silane is selectively introduced into the oven when the measured residual oxygen content is above a predetermined value.

12. A process for the production of a controlled atmosphere substantially free of residual oxidizing gases for annealing steel with a low carbon content in a bell oven, comprising effecting a first injection of silane during a temperature rise, at a temperature below 630° C., in an amount such as to provide a first ratio R of the content of silane injected, to the content of oxidizing gases to be eliminated, above 5 and less than or equal to 20, and then effecting at least a second injection of silane during cooling with the silane being injected in an amount such as to provide a reduced second ratio R.

* * * * *